United States Patent Office 2,968,681
Patented Jan. 17, 1961

2,968,681

METHOD OF PREPARING HYDROGENATED BINAPHTHYLS

George L. O'Connor and Henry E. Fritz, South Charleston, and Marion A. Eccles, Nitro, W. Va., assignors to Union Carbide Corporation, a corporation of New York No Drawing. Filed Feb. 17, 1959, Ser. No. 793,676

10 Claims. (Cl. 260—667)

The present invention relates to new compositions of matter and to processes for their production. More particualrly, the invention is concerned with the production of novel hydrogenation binaphthyls; viz. 1,2,3,4-tetrahydro-2,2'-binaphthyl, represented by the general formula:

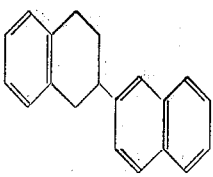

and 1,1', 2,2', 3,3', 4,4'-octahydro-2,2'-binaphthyl represented by the general formula:

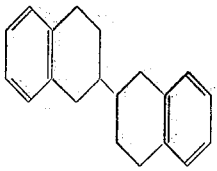

In accordance with the broadest aspects of the invention, the hydrogenated binaphthyls herein described are prepared by the hydrogenation of naphthalene in the presence of catalytic amounts of metallic potassium, under the operating conditions of temperature and hydrogen pressure as set forth below. Upon completion of the reaction, the hydrogenated binaphthyls can be recovered from the crude reaction product and thereafter separated in any convenient manner.

While the amount of metallic potassium suitable for use as a catalyst in the process of the invention is not narrowly critical, both the rate of hydrogenation and the yield of hydrogenated binaphthyls have been found to vary in direct proportion to the concentration of metallic potassium that is employed. For example, best results, measurable in terms of highest reaction rates and yields of hydrogenated binaphthayls, have been obtained when metallic potassium is incorporated in the reaction mixture in a preferred proportion of from about 0.5 percent to about 3.0 percent metallic potassium by weight of the naphthalene reactant, with concentrations as low as about 0.03 percent metallic potassium by weight of naphthalene, or slightly lower, permitting satisfactory operation. Higher concentrations of catalyst can also be employed. However, little commensurate advantage is ordinarily to be expected by the use of metallic potassium in concentrations in excess of the preferred range.

Although the presence of metallic potassium as a catalyst has been found essential to the production of hydrogenated binaphthyls by the hydrogenation of naphthalene, the potassium catalyst need not be introduced to the reaction mixture in elemental form. Any inert potassium compound from which metallic potassium can be obtained in situ is suiable for use in the process of the invention. By way of illustration, particularly efficient results have been achieved utilizing a mixture of metallic sodium and potassium compound such as potassium hydroxide, potassium oxide, potassium sulfate or the like, which compound is capable of reacting with the metallic sodium under the operating conditions of the invention so as to produce metallic potassium. Such reaction is accompanied generally by the formation of the corresponding sodium compound. For instance, potassium hydroxide will react with metallic sodium to produce metallic potassium and sodium hydroxide. Similarly, potassium oxide will react with metallic sodium to produce metallic potassium and sodium oxide, etc.

When the use of a mixture of metallic sodium and a potassium compound as hereinabove described is desired, the mixture is necessarily incorporated with the reactants in a quantity sufficient to provide a catalytic amount of metallic potassium. The quantities required in this respect can readily be determined by one skilled in the art in light of this disclosure. Moreover, an excess of metallic sodium over the quantity required for reaction with the potassium compound, and particularly an excess of from about 1.0 percent to about 3.0 percent metallic sodium by weight of naphthalene, is preferably utilized. The additional presence of metallic sodium in the reaction mixture serves to improve the rate of hydrogenation and to remove impurities such as water or sulfur from the reactants. The necessity for using a purified naphthalene feed is thereby eliminated and the quality of the product substantially enhanced. For similar reasons, even when the potassium catalyst is introduced to the reaction mixture in elemental form, it is preferable to incorporate metallic sodium in the reaction mixture in a concentration of up to about 3.0 percent by weight of naphthalene. Higher concentrations of metallic sodium can also be employed, with, however, little additional advantage.

It has also been found that the incorporation of tetralin in the reaction mixture, preferably in an amount equal in weight to the amount of naphthalene employed is of benefit to the invention. The tetralin serves as a solvent for the naphthalene reactant and facilitates the handling of the naphthalene as a liquid during the process.

The hydrogenation is carried out at a reaction temperature of at least about 150° C. and preferably at a temperature of from about 200° C. to about 300° C. The maximum operable temperature is determined by the temperature at which decomposition of the reactants or of the products occurs, and can readily be ascertained by one skilled in the art in light of this disclosure. As the reaction temperature increases, the rate of hydrogenation has been found to increase exponentially. However, the advantage of improved reaction rates is usually not commensurate with the additional use of special apparatus and other operating procedures necessary to effect and maintain the reaction temperatures substantially above the preferred range. Further, within the operable temperature range, the hydrogenation can be performed utilizing an initial hydrogen pressure of at least about 500 p.s.i.g. up to about 3,000 p.s.i.g., or higher, with the reaction preferably being carried out at an initial hydrogen pressure of from about 1000 p.s.i.g. to about 3000 p.s.i.g. It is to be noted in this respect that, at temperatures below about 150° C. and hydrogen pressures below about 500 p.s.i.g., the hydrogenation of naphthalene to yield the hydrogenated binaphthyls of the invention has not been found to occur.

In an embodiment of the invention, a mixture containing naphthalene, tetralin when desired, and either metallic potassium, a mixture of metallic potassium and metallic sodium, or a mixture of metallic sodium and a potassium compound capable of reacting therewith so as to form metallic potassium, is charged to a suitable reactor or autoclave in proportions as hereinabove prescribed. Hydrogen is subsequently introduced to the reaction system and the hydrogen pressure and reaction temperature adjusted to within the operable range. The reaction is allowed to proceed to completion as determined, for example, by the decrease in hydrogen pressure or in any other manner. In this connection, the hydrogenation is generally discontinued when the rate of decrease in hydrogen pressure becomes less than about one p.s.i.g. per minute.

Upon completion of the hydrogenation, the hydrogenated binaphthyls thus formed can be recovered from the crude reaction product and separated. A suitable recovery and separation procedure, for instance, lies in the fractional distillation of the crude reaction product. Other convenient methods of recovery and separation can also be employed.

The hydrogenated binaphthyls produced in accordance with the invention may subsequently be utilized in a number of diverse applications. The products are, for example, of interest and can be utilized as a plasticizer for vinyl resins such as polyvinyl chloride or copolymers of vinyl chloride with other polymerizable compounds such as vinyl acetate, or as a plasticizer extender for use with conventional primary plasticizers such as dioctyl phthalate.

The invention can be illustrated further in connection with the following specific examples of its practice.

EXAMPLE 1

A mixture containing 100 grams each of naphthalene and tetralin and 2.5 grams each of metallic potassium and metallic sodium was introduced to a stainless steel rocker bomb reactor. The reactor was purged with hydrogen and a positive hydrogen pressure of 2000 p.s.i.g. applied to the contents. The reaction mixture was then heated to a temperature of 200° C., whereupon the pressure within the reactor rose to 2,700 p.s.i.g. The reaction mixture was maintained at this temperature level for one hour, during which time the pressure within the reactor fell to 1,900 p.s.i.g. Upon completion of the hydrogenation, the crude reaction product was found to contain less than one percent by weight of naphthalene. The crude was subsequently combined with the crude obtained from twelve similar runs, and stripped of tetralin and any other low-boiling material present by distillation at a temperature up to 208° C., under atmospheric pressure. The residue, composed principally of a mixture of 1,2,3,4-tetrahydro-2,2'-binaphthyl and 1,1', 2,2',3,3',4,4'-octahydro-2,2'-binaphthyl, weighed 466 grams. A 344-gram portion of the residue was subsequently subjected to further fractional distillation in order to separate the components of the product. Thus, at a temperature of from 176° C. to 178° C., under a pressure of 0.5 mm. of mercury, 200 grams of 1,1',2,2',3,3',4,4'-octahydro-2,2'-binaphthyl were collected as a distillate. Similarly, at a temperature of from 190° C. to 195° C. under a pressure of 0.5 mm. of mercury, 60 grams of 1,2,3,4-tetrahydro-2,2'-binaphthyl were obtained. The octahydrobinaphthyl product was recovered as a viscous oil at room temperature, having a density of 1.09 and an index of refraction of 1.6042. The tetrahydrobinaphthyl product was recovered as a white solid at room temperature, having a melting point of 106° C.

EXAMPLE 2

In the manner and using the equipment described above in Example 1, a series of experiments were conducted in which reaction mixtures, each containing 100 grams of naphthalene, 100 grams of tetralin, 2 grams of metallic sodium and varying quantities of potassium hydroxide as indicated below in Table A, were hydrogenated at a temperature of 300° C., under an initial hydrogen pressure of 2000 p.s.i.g. Also included as a control was one run in which the use of potassium hydroxide was omitted. The hydrogenated binaphthyl products thus formed were subsequently recovered and separated by fractionation. The data obtained from the runs are tabulated below in Table A, wherein the concentration of potassium hydroxide employed, the concentration of metallic potassium in the reaction mixture (theoretically based upon a complete liberation of metallic potassium by sodium in situ) and the yield of hydrogenated binaphthyls are indicated in percent by weight based upon the weight of the naphthalene utilized as a reactant.

*Table A*

| Run No. | Concentration of Potassium Hydroxide | Concentration of Metallic Potassium | Yield of Hydrogenated Binaphthyls |
| --- | --- | --- | --- |
| 1 | 0.0 | 0.0 | 0.0 |
| 2 | 0.05 | 0.035 | 8.0 |
| 3 | 0.10 | 0.070 | 8.0 |
| 4 | 1.0 | 0.70 | 22.0 |

Thus, it can be seen from the above table that improved yields of hydrogenated binaphthyls are directly effected by an increase in the concentration of the potassium catalyst.

EXAMPLE 3

To evaulate the effectiveness of hydrogenated binaphthyls as a plasticizer for vinyl resins, a series of experiments were conducted in which varying amounts of 1,1', 2,2',3,3',4,4'-octahydro-2,2'-binaphthyl, prepared substantially as described above in Example 1, and a 97.5:2.5 vinyl chloridevinyl acetate copolymer resin, having a reduced viscosity of 1.05, were mixed by stirring in a beaker. Also incorporated in the mixtures were small amounts of a conventional heat stabilizer, dibutyltin maleate. The proportions employed in each run are set forth below in Table B, and indicated therein as parts by weight based upon the total weight of the mixture.

*Table B*

|  | Run No. 1 | Run No. 2 | Run No. 3 |
| --- | --- | --- | --- |
| Resin | 58.5 | 53.5 | 48.5 |
| Hydrogenated binaphthyl plasticizer | 41.0 | 46.0 | 51.0 |
| Stabilizer | 0.5 | 0.5 | 0.5 |

The resulting mixtures were then fluxed for a period of 5 minutes, at a temperature of 158° C., on a laboratory, two-roll, equal-speed mill to obtain transparent sheets which were flexible at room temperature. Specimens were then taken from the milled sheet and evaluated. The results obtained are tabulated below in Table C.

*Table C*

|  | Run No. 1 | Run No. 2 | Run No. 3 |
| --- | --- | --- | --- |
| Tensile strength (p.s.i.)[1] | 2,770 | 2,520 | 2,175 |
| Percent elongation [1] | 250 | 260 | 280 |
| Load at 100 percent elongation (p.s.i.)[1] | 2,275 | 1,800 | 1,300 |
| Stiffness modulus (p.s.i.)[2] | 5,800 | 1,400 | 695 |
| $T_f$(° C.)[3] | 11 | 1 | −1 |
| $T_t$(° C.)[3] | 29 | 20 | 16 |
| $T_b$(° C.)[4] | 16 | 12 | 4 |
| Percent extraction in oil [5] | 0.4 | 2.1 | 4.1 |
| Percent extraction in water [6] | 0.4 | 0.8 | 1.5 |
| Durometer "A" hardness [7] | 88 | 77 | 65 |
| Percent volatile loss [8] | 10.0 | 12.6 | 15.6 |

[1] As read from a stress-strain curve obtained at a temperature of 23° C. using a Scott L-6 tensile tester operating at a constant rate of extension of four feet per minute.
[2] A.S.T.M. method D747–50.
[3] A.S.T.M. method D1043–51.
[4] A.S.T.M. method D746–55T.
[5] Weight loss after 10 days in mineral oil at a temperature of 23° C. (4-mil film).
[6] Weight loss after 10 days in distilled water at a temperature of 23° C. (4-mil film).
[7] A.S.T.M. method D676–49T.
[8] A.S.T.M. method D1203–55.

The invention is capable of modification within the scope of the appended claims.

What is claimed is:
1. A process for the production of 1,2,3,4-tetrahydrobinaphthyl and 1,1′,2,2′,3,3′,4,4′-octahydrobinaphthyl which comprises hydrogenating naphthalene at a temperature of at least about 150° C., under a hydrogen pressure of at least about 500 p.s.i.g., in the presence of at least about 0.03 percent by weight of metallic potassium based upon the weight of naphthalene, and recovering the 1,2,3,4-tetrahydrobinaphthyl and 1,1′,2,2′,3,3′,4,4′-octahydrobinaphthyl thereby formed from the crude reaction product.

2. A process for the production of 1,2,3,4-tetrahydrobinaphthyl and 1,1′,2,2′,3,3′,4,4′-octahydrobinaphthyl which comprises hydrogenating naphthalene at a temperature of between about 200° C. and about 300° C., under a hydrogen pressure of between about 1000 p.s.i.g. and about 3000 p.s.i.g., in the presence of at least about 0.03 percent by weight of metallic potassium based upon the weight of naphthalene, and recovering the 1,2,3,4-tetrahydrobinaphthyl and 1,1′,2,2′,3,3′,4,4′-octahydrobinaphthyl thereby formed from the crude reaction product.

3. A process for the production of 1,2,3,4-tetrahydrobinaphthyl and 1,1′,2,2′,3,3′,4,4′-octahydrobinaphthyl which comprises hydrogenating naphthalene at a temperature of between about 200° C. and about 300° C., under a hydrogen pressure of between about 1000 p.s.i.g. and about 3000 p.s.i.g., in the presence of between about 0.5 percent and about 3.0 percent by weight of metallic potassium based upon the weight of naphthalene, and recovering the 1,2,3,4-tetrahydrobinaphthyl and 1,1′,2,2′,3,3′,4,4′-octahydrobinaphthyl thereby formed from the crude reaction product by fractional distillation.

4. A process for the production of 1,2,3,4-tetrahydrobinaphthyl and 1,1′,2,2′,3,3′,4,4′-octahydrobinaphthyl which comprises hydrogenating naphthalene at a temperature of at least about 150° C., under a hydrogen pressure of at least about 500 p.s.i.g., in the presence of at least about 0.03 percent by weight of metallic potassium and up to about 3.0 percent by weight of metallic sodium based upon the weight of naphthalene, and recovering the 1,2,3,4-tetrahydrobinaphthyl and 1,1′,2,2′,3,3′,4,4′-octahydrobinaphthyl thereby formed from the crude reaction product.

5. A process for the production of 1,2,3,4-tetrahydrobinaphthyl and 1,1′,2,2′,3,3′,4,4′-octahydrobinaphthyl which comprises hydrogenating naphthalene at a temperature of between about 200° C. and about 300° C., under a hydrogen pressure of between about 1000 p.s.i.g. and about 3000 p.s.i.g., in the presence of at least about 0.03 percent by weight of metallic potassium and up to about 3.0 percent by weight of metallic sodium based upon the weight of naphthalene, and recovering the 1,2,3,4-tetrahydrobinaphthyl and 1,2′,2,2′,3,3′,4,4′-octahydrobinaphthyl thereby formed from the crude reaction product.

6. A process for the production of 1,2,3,4-tetrahydrobinaphthyl and 1,1′,2,2′,3,3′,4,4′-octahydrobinaphthyl which comprises hydrogenating naphthalene at a temperature of between about 200° C. and about 300° C., under a hydrogen pressure of between about 1000 p.s.i.g. and about 3000 p.s.i.g., in the presence of between about 0.5 percent and about 3.0 percent by weight of metallic potassium and between about 1.0 percent and 3.0 percent by weight of metallic sodium based upon the weight of naphthalene, and recovering the 1,2,3,4-tetrahydrobinaphthyl and 1,1′,2,2′,3,3′,4,4′-octahydrobinaphthyl thereby formed from the crude reaction product by fractional distillation.

7. A process for the production of 1,2,3,4-tetrahydrobinaphthyl and 1,1′,2,2′,3,3′,4,4′-octahydrobinaphthyl which comprises hydrogenating a mixture containing naphthalene, metallic sodium and a potassium compound selected from the group consisting of potassium hydroxide, potassium oxide and potassium sulfate at a temperature of at least about 150° C., under a hydrogen pressure of at least about 500 p.s.i.g., said metallic sodium and potassium compound being initially present in said mixture in an amount sufficient to provide upon reaction at least about 0.03 percent by weight of metallic potassium based upon the weight of naphthalene, and recovering the 1,2,3,4-tetrahydrobinaphthyl and 1,1′,2,2′,3,3′,4,4′-octahydrobinaphthyl thereby formed from the crude reaction product.

8. A process for the production of 1,2,3,4-tetrahydrobinaphthyl and 1,1′,2,2′,3,3′,4,4′-octahydrobinaphthyl which comprises hydrogenating a mixture containing naphthalene metallic sodium and a potassium compound selected from the group consisting of potassium hydroxide, potassium oxide and potassium sulfate at a temperature of between about 200° C. and about 300° C., under a hydrogen pressure of between about 1000 p.s.i.g. and about 3000 p.s.i.g., said metallic sodium and potassium compound being initially present in said mixture in an amount sufficient to provide upon reaction at least about 0.3 percent by weight of metallic potassium based upon the weight of naphthalene, and recovering the 1,2,3,4-tetrahydrobinaphthyl and 1,1′,2,2′,3,3′,4,4′-octahydrobinaphthyl thereby formed from the crude reaction product.

9. A process for the production of 1,2,3,4-tetrahydrobinaphthyl and 1,1′,2,2′,3,3′,4,4′-octahydrobinaphthyl which comprises hydrogenating a mixture containing naphthalene, metallic sodium and a potassium compound selected from the group consisting of potassium hydroxide, potassium oxide and potassium sulfate at a temperature of between about 200° C. and about 300° C., under a hydrogen pressure of between about 1000 p.s.i.g. and about 3000 p.s.i.g., said metallic sodium and potassium compound being initially present in said mixture in an amount sufficient to provide upon reaction between about 0.5 percent and about 3.0 percent by weight of metallic potassium based upon the weight of naphthalene, and recovering the 1,2,3,4-tetrahydrobinaphthyl and 1,1′,2,2′, 3,3′,4,4′-octahydrobinaphthyl thereby formed from the crude reaction product.

10. A process according to claim 9 wherein the potassium compound is potassium hydroxide.

References Cited in the file of this patent
UNITED STATES PATENTS

| | | |
|---|---|---|
| 1,898,966 | Spilker | Feb. 21, 1933 |
| 2,021,567 | Muckenfuss | Nov. 19, 1935 |
| 2,473,997 | Hansley | June 21, 1949 |
| 2,478,205 | Orchin | Aug. 9, 1949 |
| 2,481,921 | Gwynn | Sept. 13, 1949 |

FOREIGN PATENTS

| | | |
|---|---|---|
| 425,363 | Great Britain | Mar. 13, 1935 |

OTHER REFERENCES

Sisido et al.: Journal of the American Chemical Society, vol. 70 (1948), pages 1609–1612.